72-421 SR
FIP8009 OR X 9,666
J. Rouse,
Making Hinges,
No. 9.666 x
Patented May 17, 1836.
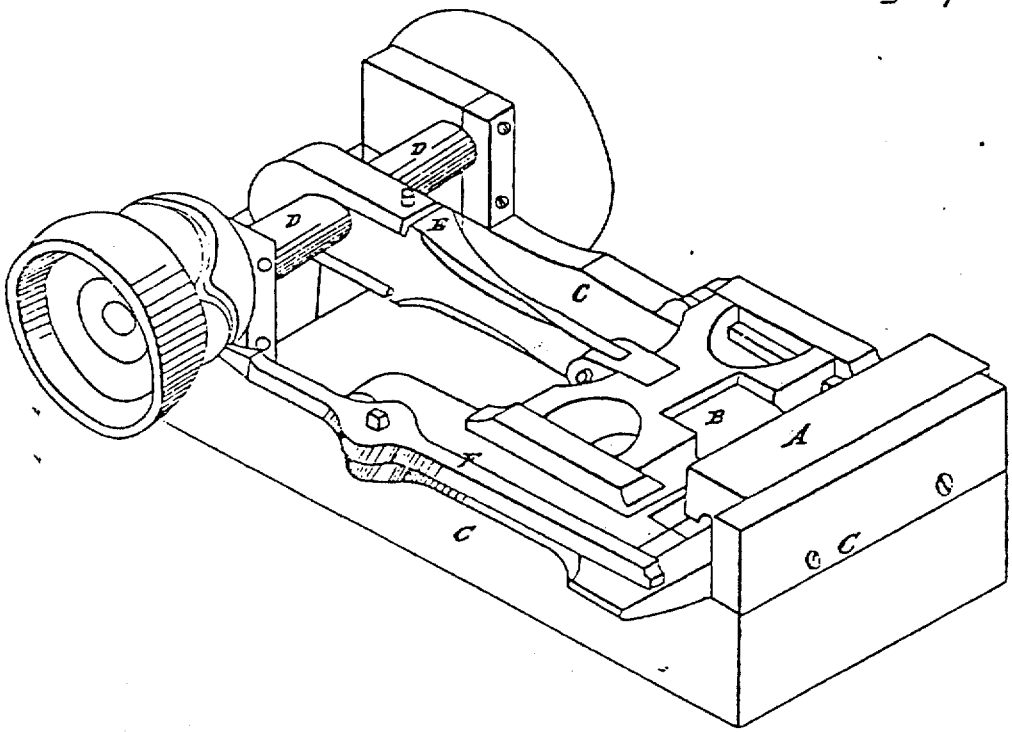
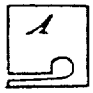
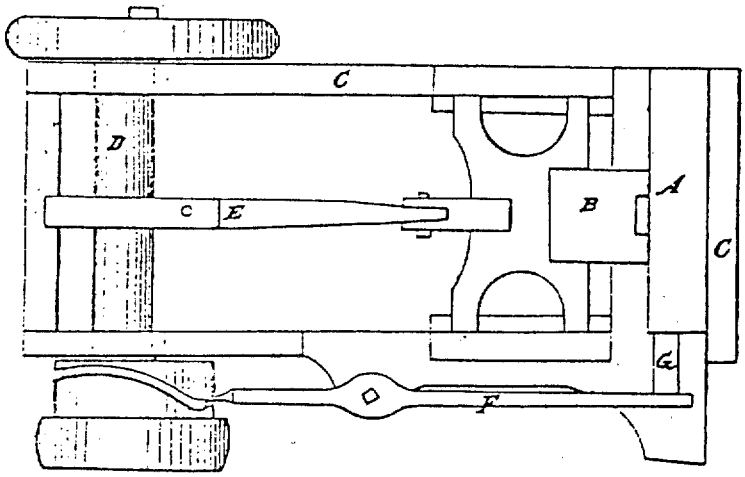

May 17. 1836.
Patented May 17. 1836.
364 9666X 89.

Jonas Rouse

The schedule referred to in these Letters Patent and mak-
ing part of the same containing a description in the words
of the said Jonas Rouse himself of his improvement in
the machine for making Butts and Hinges.
To all to whom these presents shall come. Be it known
that I Jonas Rouse of the City of Troy in the County of
Rensselaer and State of New York have invented a new
and useful machine for making butts & hinges & that the follow-
ing is a full and exact description thereof — The improve-
ment is to be applied to the manufacturing of butts & hinges of
malleable or ductile metal, The two plates which form
the butt or hinge are to be prepared separately as in the or-
dinary method of making hinges of like description each
with projections from one edge, as tongues corresponding to the
space between the tongues of the other plate with and in which
they are to match. These tongues turned ~~[illegible]~~ or bent over flat
wise form what are called the eyes of the hinge, and when
placed together the eyes of each plate between those of the
other with a wire or rivet through them constitute the
joint of the hinge. The machine here to be described is for
bending the tongues of the hinge plates from the straight and
cylinder position they are in when thus prepared and
forming them into eyes. To do this a die is to be formed in a
block of steel or other suitable material to be provided for the
purpose. This is to consist of an aperture or a groove of the thick
ness of the hinge plates for which it is designed extending into
the sides of the block a distance equal to about the length of the
plate and tongues with the tongues cylinder and then to
increase in a circular enlargement on one side of the groove
corresponding in size and form to the outside surface of the
eye of the hinge so that the form of the opening with its circular
termination when viewed endwise will be the same as the outline

9666X of a [illegible] on each side of the hinge plate after the eye is formed.
The whole of this opening is to be extended through the entire length
of the block. This constitutes the die. And the eyes of the hinge
are formed by placing the plate with the tongues extended
within the groove at its mouth and forcing the tongues
end foremost into the circular termination of it. The effect
of which will be that as the tongues enter the circle in the di-
rected direction of a tangent line from it, the ends are forced
round its surface, which for this purpose should be smooth,
till the tongues conforming to the curve become bent flatwise
in their whole length, or so as to bring the ends over to the same
surface as to that of the plate to which they belong. To effect this
operation a steel follower adapted to the groove and the end
of it to the edge of the hinge plate should be provided and
a reciprocating movement given to it sufficient in extent
and power to force the tongues effectually into the eye and
then to return back far enough to allow the hinge plate
to be removed and another placed before the follower ready
for a like operation. This may be done by fixing the die
firmly upon a frame to be provided for the purpose and carry-
ing a shaft with a crank or eccentric [illegible] [illegible] be-
fore it, and a pitman or shackle bar connected therewith
and extended to and connected with the follower by a
flexible joint such as is ordinarily applied to operations
of that kind will give the movement required. Or such
other means or power as are commonly used for producing
movements of like nature, as well as usual methods for [illegible]
driving the necessary power, as by [illegible] gearing or otherwise
may be adopted in this case as shall be deemed expedient;
the follower may be supported and kept true in its operation
by means of projections or wings to ledges extending from
it horizontally and connected to the tongues and grooves or
otherwise with the fixtures of the frame provided for the purpose.
[illegible]

A [illegible] lever extending along on one side of the frame from near
the shaft to a point opposite the end of the die, may be so conne-
cted with the machinery as to have a lateral movement out and
in given to the end next the shaft by means of a cam upon
the side of the wheel which turns the shaft or of a wheel or pulley
connected and revolving with it; so that by suspending or attach-
ing it by a movable joint to a fixture of the frame provided
for the purpose as its fulcrum at such point between the two
ends ~~[illegible]~~ as shall be selected, the same reciprocating
motion will thereby be given to the end opposite the die, which
by attaching a follower thereto or tending towards the end
of the die, and so as to have it move backwards and forwards
in the direction of the length of the die it may be made to en-
ter into it and remove the hinge plate after the eye is for-
med by pushing it out at the opposite end. The relative
position of the cam which gives this motion in respect to
the movement of the other follower may be such as to cause the
inward and outward motion of the two followers so far to
alternate with each other so that when the first is being
withdrawn from the die and preparatory to its return with
another hinge plate before it, the end follower will pass
in and remove the plate which is finished. So also the ex-
tent of the motion of the end follower may be adapted to such
a purpose by the location of the fulcrum of the lever as in fix-
ing it nearer one end than the other as in the extent as the
length of the lever or size of the cam may require. Or instead
of a lever for the above purposes the same effect may be produced
by means of a shaft along the side of the frame to be connected
by gears with the revolving shaft in front of the die and
[illegible] a cam or eccentric motion opposite the end of the die
so as to give the out and in motion of ^and^ the follower, the neces-
sary connecting appendages being supplied at discretion. In
order to accelerate the return of the end follower after being
the

16664 thus carried into the die by the action of the lever or of the cam
upon the lateral shaft, a spring may be attached to a fixed line
of the frame and be so applied to the lever or an appendage of it or one
made on to an appendage of the follower or the other as to replace
the follower in its outward position the instant the spring
crank shall have passed the point of its extreme action for propelling
it forward. The cranks for this purpose should be formed with a con-
[illegible] sufficiently short or abrupt to admit of such motion.
This provision is for the purpose of preventing any interference between
the followers or hinge plates within the die, which a slower
movement in this particular might occasion, as this is the
description of the principle rather than of the specific manner
in which the result is to be ~~[illegible]~~ obtained its practical
application is left as a matter of discretion to be exercised
in the construction of this part of the apparatus. By placing
a hinge plate as prepared for the die, before the said follower
with the tongues extended in the right direction the
same may be carried in by it sideways and placed in
the groove before the other follower ready to be forced into its
[illegible]. As the plate thus supplied may be made to push
before it that which is finished and remaining within the die
and in that way clear or prepare the passage for the return
of the other follower. Upon this principle an upright box or tube
may be provided and fixed as a hopper before the said follower
in such manner that an indefinite number of hinge plates
may be placed one upon another therein with the tongues
all one direction and the follower in its motion towards
the die be made to carry before it into the groove the lowest
hinge plate in the pile and when again drawn back to the
out side of the hopper the rest of the pile of plates within by their gravity
be successively and each drawn before it to be carried forward
in the same manner. The hopper in this mode should be so
constructed as to leave a passage open between the follower and the and the die sufficient for the lower plate to be carried through
while those above will be kept in place by the sides of the box
until the follower is again drawn back from under them.
[illegible] of this location for the hopper it may be fixed
in front of the die before the other follower so as to have the
lower hinge carried by it directly into the die with the
tongues and formed. While the end follower may as
before be applied to the removing of the plates from the die
when finished. Instead of a die of the foregoing description
one may be made to answer the same purpose by being di-
vided horizontally into two parts — the division commen-
cing at or near the back part of the circular termination of
the groove and continuing through to the back side of the block
or of the two pieces which in this case would be substituted for
it. In any other respect the die should be the same as that
above described. In order to keep them firmly together du-
ring the process of forming the eyes of the hinge plate and to re-
sist the pressure which that shall occasion, an operative
roller should be placed over the top extending across the
frame and secured by journals in fixtures provided therefor
at the ends so that by turning the projecting side of the roller
down upon the upper part of the die, it will press firmly on it
and produce the form the same as if it were constructed of one
~~[illegible]~~ block, and by turning the roller back after the eye is
formed it will relieve the plates from the pressure to which
it will necessarily be subjected by the process and allow it
to be more readily removed, and this is the purpose of the
proposed division. Of the improvements thus herein
above specified and described, I claim as my own invention
the manner and principles of turning or bending the tongues
of hinge or butt plates of malleable or ductile metal and
forming them into eyes by forcing them into a die construc-
ted for that purpose. And I also claim the machine

144

~~9666X~~ as above described and the principles thereby embraced and every part thereof as above combined and as constituting a whole and as specially applicable to the above purpose of bending the tongues and forming the eyes of hinges, and to the special process therewith connected.

Witnesses

Daniel Whiting

L. Bliss

Jonas Rouse